(12) United States Patent
Sugimoto et al.

(10) Patent No.: US 7,711,872 B2
(45) Date of Patent: May 4, 2010

(54) STORAGE APPARATUS, PROCESS CONTROLLER, AND STORAGE SYSTEM

(75) Inventors: Sadahiro Sugimoto, Yokohama (JP); Kazuyoshi Serizawa, Tama (JP); Yasutomo Yamamoto, Sagamihara (JP); Hisao Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 138 days.

(21) Appl. No.: 11/969,241

(22) Filed: Jan. 4, 2008

(65) Prior Publication Data

US 2009/0089458 A1    Apr. 2, 2009

(30) Foreign Application Priority Data

Oct. 2, 2007    (JP) .............................. 2007-258243

(51) Int. Cl.
| G06F 13/00 | (2006.01) |
| G06F 3/00  | (2006.01) |
| G06F 5/00  | (2006.01) |
| G06F 15/16 | (2006.01) |
| G06F 12/00 | (2006.01) |
| G06F 13/28 | (2006.01) |

(52) U.S. Cl. .............................. 710/34; 710/5; 710/18; 710/36; 710/51; 710/57; 345/503; 711/114; 711/170

(58) Field of Classification Search .................... 710/5, 710/18, 34, 36, 51, 57; 345/503; 711/114, 711/170
See application file for complete search history.

(56) References Cited

U.S. PATENT DOCUMENTS

| 6,771,269 B1 * | 8/2004 | Radecki et al. ............. 345/503 |
| 2005/0193168 A1 * | 9/2005 | Eguchi et al. ............... 711/114 |
| 2006/0248237 A1 | 11/2006 | Ido et al. |

FOREIGN PATENT DOCUMENTS

JP    2002-108567 A    4/2002

* cited by examiner

Primary Examiner—Alford W Kindred
Assistant Examiner—Farley J Abad
(74) Attorney, Agent, or Firm—Sughrue Mion, PLLC

(57) ABSTRACT

A storage apparatus comprises: a memory for storing a processing ratio/upper limit table, which stores an upper limit number per prescribed time for input/output processing in accordance with the processing of a processing type for each of a plurality of processing types executed by a host computer; and a processor which receives an input/output request from the host computer, and executes input/output processing corresponding to the input/output request, such that input/output processing corresponding to the processing of each processing type per prescribed time falls within the upper limit number. According to this constitution, the input/output processing count per prescribed time can be properly controlled in accordance with the processing type.

14 Claims, 7 Drawing Sheets

FIG. 2

PROCESSING RATIO/UPPER LIMIT TABLE

22A

| PROCESSING TYPE | JOB 1 | JOB 2 | 22a |
| --- | --- | --- | --- |
| PROCESSING RATIO | 3 | 2 | 22b |
| PROCESSING UPPER LIMIT | ∞ | 3000 | 22c |
| REMAINING PROCESSING COUNTER | 3 | 2 | 22d |

FIG. 3

PROCESSING RATIO/UPPER LIMIT TABLE

22B

| PROCESSING TYPE | JOB 3 | OTHER | 22a |
| --- | --- | --- | --- |
| PROCESSING RATIO | 2 | 1 | 22b |
| PROCESSING UPPER LIMIT | 4000 | 1500 | 22c |
| REMAINING PROCESSING COUNTER | 2 | 1 | 22d |

FIG. 4

42 — PERFORMANCE MANAGEMENT TABLE

| PROCESSING TYPE | JOB 1 | JOB 2 | JOB 3 | OTHER | |
|---|---|---|---|---|---|
| PROCESSING TYPE | JOB 1 | JOB 2 | JOB 3 | OTHER | 42a |
| TARGET PERFORMANCE VALUE [IOPS] | 3000 | 2000 | 2000 | 1000 | 42b |
| MEASURED PERFORMANCE VALUE [IOPS] | 3500 | 1000 | 4000 | 1100 | 42c |
| DISK USE FREQUENCY [IOPS] | 700 | 600 | 1000 | 300 | 42d |
| PROCESSING UPPER LIMIT [IOPS] | ∞ | 3000 | 4000 | 1500 | 42e |
| PROCESSING RATIO | 3 | 2 | 2 | 1 | 42f |

FIG. 5

43 — LOAD STATUS TABLE

| PART | PROCESSOR A | PROCESSOR B | VOLUME A | VOLUME B | |
|---|---|---|---|---|---|
| PART | PROCESSOR A | PROCESSOR B | VOLUME A | VOLUME B | 43a |
| UTILIZATION FACTOR [%] | 62 | 34 | 41 | 95 | 43b |

FIG. 6

44 — PARTS MANAGEMENT TABLE

| PROCESSING TYPE | JOB 1 | JOB 2 | JOB 3 | OTHER | |
|---|---|---|---|---|---|
| PROCESSING TYPE | JOB 1 | JOB 2 | JOB 3 | OTHER | 44a |
| PROCESSOR A | 1 | 1 | 0 | 0 | 44b |
| PROCESSOR B | 0 | 0 | 1 | 1 | 44c |
| VOLUME A | 1 | 0 | 0 | 1 | 44d |
| VOLUME B | 0 | 1 | 1 | 0 | 44e |

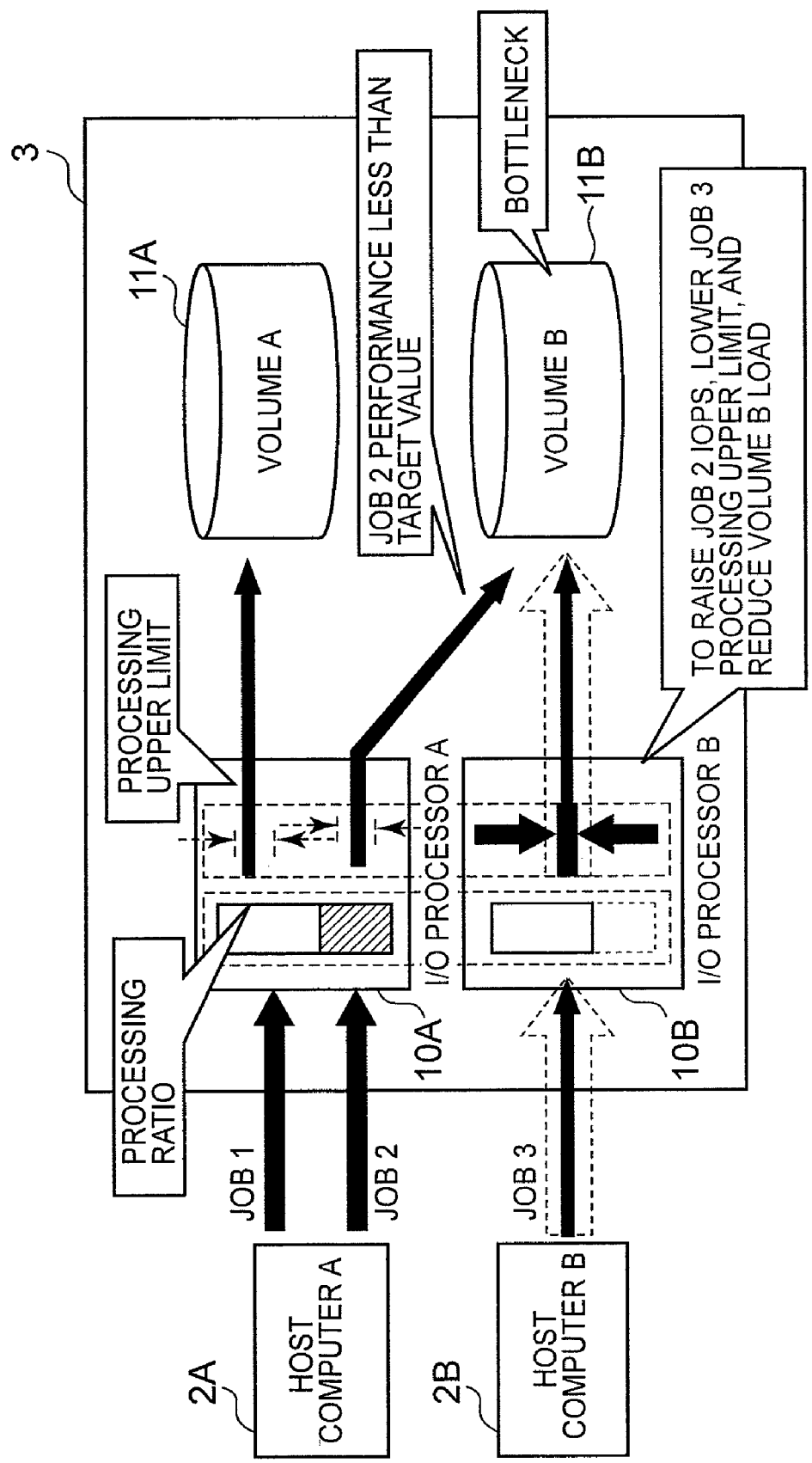

US 7,711,872 B2

STORAGE APPARATUS, PROCESS CONTROLLER, AND STORAGE SYSTEM

CROSS-REFERENCE TO PRIOR APPLICATION

This application relates to and claims the benefit of priority from Japanese Patent Application number 2007-258243, filed on Oct. 2, 2007, the entire disclosure of which is incorporated herein by reference.

BACKGROUND

Conventionally, in a storage apparatus, data input/output (I/O) processing relative to a data I/O request from a host computer is carried out by a processor corresponding to the port connected to this host computer. For this reason, data I/O processing of high-priority jobs and low-priority jobs may be carried out by the same processor. In a situation like this, when the low-priority job load is great, the affects of this load can make it impossible to ensure bandwidth for high-priority jobs.

A method for solving this problem has been proposed (refer to Japanese Patent Laid-open No. 2002-108567) whereby a user configures in a single storage apparatus either an upper limit or threshold for a data I/O process, which treats either a port, WWN (World Wide Name) or device as a unit, and suppresses data I/O for non-priority jobs, thereby ensuring bandwidth for the I/O of data for priority jobs.

However, in the method disclosed in Japanese Patent Laid-open No. 2002-108567, only I/O of non-priority data is suppressed. Therefore, when there is a plurality of high-priority data, since the respective high-priority data will be handled uniformly, the input/output of one high-priority data will prevent the input/output of other high-priority data.

Further, since the method disclosed in Japanese Patent Laid-open No. 2002-108567 configures an upper limit, which treats a port, WWN or device as a unit, for example, when a port is treated as the unit and an upper limit is configured, it is not possible to adjust I/O processing among a plurality of jobs utilizing the same port. That is, when the same port is being used, it is not possible to give precedence to I/O processing of a high-priority job even when there are jobs with different priorities.

SUMMARY

With the foregoing in view, an object of the present invention is to provide technology capable of properly controlling input/output processing in accordance with the processing type.

To achieve the above-mentioned object, a storage apparatus according to an aspect of the present invention is a storage apparatus, which executes input/output processing relative to a volume based on an input/output request in accordance with the processing of a plurality of processing types executed by a host computer, the storage apparatus having: an upper limit number storage unit which stores an upper limit number per prescribed time for the input/output processing count (the number of times that input/output processing is carried out) in accordance with the processing of the processing type for each of the plurality of processing types; a receiving unit which receives the input/output request from the host computer; and an input/output processing execution unit which executes input/output processing corresponding to the received input/output request such that the input/output processing count resulting from the processing of each of the processing types per the prescribed time falls within the upper limit number.

BRIEF DESCRIPTION OF THE DRAWINGS

FIG. 2 is a diagram showing an example of a processing ratio/upper limit table of one I/O processor according to one embodiment of the present invention;

FIG. 3 is a diagram showing an example of a processing ratio/upper limit table of another I/O processor according to one embodiment of the present invention;

FIG. 4 is a diagram showing an example of a performance management table according to one embodiment of the present invention;

FIG. 5 is a diagram showing an example of a load status table according to one embodiment of the present invention;

FIG. 6 is a diagram showing an example of a parts management table according to one embodiment of the present invention;

FIG. 10 is a diagram illustrating an example of I/O process control according to one embodiment of the present invention.

DESCRIPTION OF THE PREFERRED EMBODIMENT

The embodiment of the present invention will be explained by referring to the figures. Furthermore, the embodiment explained hereinbelow does not limit the invention set forth in the claims, and not all of the combinations of characteristic features explained in the embodiment are essential as means of the invention for solving the problem.

(1) Overall Constitution of the Storage System

Figure 1:
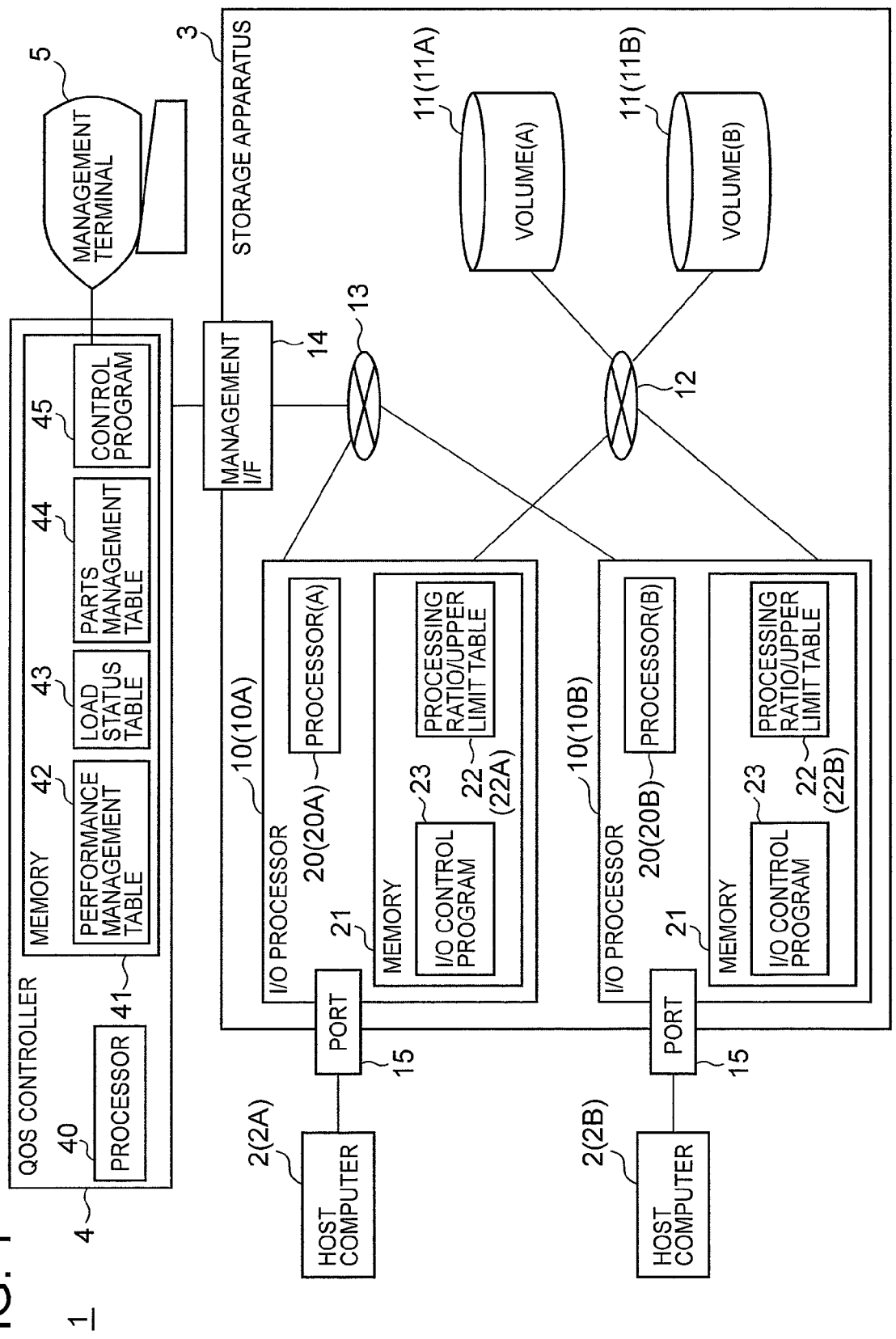
FIG. 1 is a diagram showing the overall constitution of a storage system according to one embodiment of the present invention.

FIG. 1 is a diagram showing the overall constitution of a storage system according to one embodiment of the present invention.

The storage system 1 comprises a plurality of host computers 2, at least one or more storage apparatuses 3, a QoS (Quality of Service) controller 4 as an example of a process controller, and a management terminal 5. The host computers 2 are connected to the storage apparatus 3. A Fibre Channel, Ethernet (registered trademark) or other such network can be used to connect the host computers 2 and the storage apparatus 3. This network is used mainly for data I/O.

The QoS controller 4 is connected to the storage apparatus 3. An Ethernet or other such network can be used to connect the storage apparatus 3 and the QoS controller 4. This network is used mainly for exchanging information for control.

The management terminal 5 is connected to the QoS controller 4. Furthermore, in this embodiment, the configuration is such that the management terminal 5, which is operated by the administrator, is connected directly to the QoS controller 4, but a different configuration can be used provided that management operations related to the QoS controller 4 are possible.

The storage apparatus 3 comprises a plurality of I/O (input/output) processors 10 (10A, 10B); a plurality of volumes 11 (11A, 11B); a data path 12; a management network 13; and a management I/F (interface) 14. The I/O processors 10 and volumes 11 are connected via the data path 12. Further, the I/O processors 10 are connected to the QoS controller 4 by way of the management network 13 and management I/F 14. Further, the I/O processors 10 are connected to the host computers 2.

An I/O processor 10 comprises a processor 20 (first processor); a port 15, which is an example of an interface for connecting to a host computer 2; and a memory (first memory) 21 as an example of an upper limit number storage unit and a frequency criteria information storage unit, and mediates the exchange of data between the host computer 2 and a volume 11 in accordance with a data I/O request received from the host computer 2. In the data I/O request received from the host computer 2 here, for example, there is stored a LUN (Logical Unit Number) showing the I/O-targeted volume; the I/O-targeted LBA (Logical Block Address) in the volume; and processing-type information showing the type of application process of the host computer 2 which made this I/O request.

A volume 11 is a logical storage area provided to the host computer 2, and at least one part of the storage area of either one or a plurality of hard disk drives (HDD) of the storage apparatus 3 is allocate as the logical storage area. Furthermore, in the storage apparatus 3, it is also possible to construct a RAID (Redundant Array of Independent Disks) Group using no less than 2 HDDs of a plurality of HDD, and to treat the storage area of the RAID Group as the logical storage area.

The memory 21 stores a processing ratio/upper limit table 22 as an example of an upper limit table, and an I/O control program 23. Furthermore, the memory 21 also stores other programs executed by the processor 20.

FIGS. 2 and 3 are diagrams showing examples of processing ratio/upper limit tables of I/O processors according to one embodiment of the present invention. FIG. 2 shows processing ratio/upper limit table 22A of I/O processor 10A, and FIG. 3 shows processing ratio/upper limit table 22B of I/O processor 10B.

Processing ratio/upper limit tables 22 (22A, 22B) are tables in which the processing ratio and processing upper limit of each processing type determined by the QoS controller 4 are stored. The processor 20 of the I/O processor 10 carries out data I/O control processing in accordance with this table.

The processing ratio/upper limit table 22 comprises a processing type field 22a, a processing ratio field 22b, a processing upper limit field 22c, and a remaining processing counter field 22d.

Processing type information (processing type ID), which shows the processing type to be executed by the host computer 2, is stored in the processing type field 22a. In this embodiment, for example, processing type IDs include "Job 1", "Job 2", "Job 3" and "Other". A processing ratio is stored in the processing ratio field 22b as an example of frequency criteria information, which constitutes the execution frequency criteria of the I/O processing for the corresponding processing type. The number of the upper limit (upper limit number) for the processing count in a prescribed time for I/O processing, which corresponds to an I/O request resulting from the processing of the corresponding processing type, is stored in the processing upper limit field 22c. When there is no need to restrict the processing count here, "∞" is stored. Furthermore, subsequent to implementing this table, a specific value (for example, "−1" or "0") denoting "∞" can be stored instead of "∞". The executable processing count up to a certain point in time for I/O processing, which corresponds to an I/O request resulting from the processing of the corresponding processing type, is stored in the processing counter field 22d.

From the processing ratio/upper limit table 22A shown in FIG. 2, it is clear that "Job 1" and "Job 2" are the processing-type IDs, and, for example, as for "Job 2", a processing ratio is "2" and the upper limit number is 3000 times. Further, from the processing ratio/upper limit table 22B shown in FIG. 3, it is clear that "Job 3" and "Other" are the processing-type IDs, and, for example, that as for "Job 3", a processing ratio is "2" and the upper limit number is 4000 times.

Returning to the explanation of FIG. 1, the I/O control program 23 is for executing data I/O processing in processor 20 based on a data I/O request received from the host computer 2. Furthermore, the I/O control process realized by the processor 20 executing the I/O control program 23 will be explained below. Here, a receiving unit is configured primarily by port 15 and processor 20, and an I/O processing execution unit, counter unit, and processing count determination unit are configured primarily by the processor 20.

The QoS controller 4 is for adjustably controlling a data I/O control process in the storage apparatus 3. The QoS controller 4 comprises a processor 40 (second processor); and a memory 41 (second memory) as an example of the target number storage unit. Here, a first target determination unit, shared processing-type specification unit, second target determination unit, upper limit adjustment unit, load detection unit, load determination unit, and processing information output unit are configured primarily by the processor 40.

The memory 41 has a performance management table 42 as an example of a target number table; a load status table 43; a parts management table 44; and a control program 45.

FIG. 4 is a diagram showing an example of a performance management table according to one embodiment of the present invention.

The performance management table 42 is for managing the target performance values (target numbers) of I/O processes established by the administrator for respective processing types for respective processing type (job) processing carried out by the host computer 2. In this embodiment, the number of times data I/O processing is to be executed per second in accordance with the processing of the corresponding processing type (IOPS: Input Output Per Second) is used as the target performance value. Furthermore, the constitution is such that the administrator can use the management terminal 5 to configure the target performance value in the performance management table 42.

The performance management table 42 has a processing type field 42a; target performance value field 42b; measured performance value field 42c; disk use frequency field 42d; processing upper limit field 42e; and processing ratio field 42f.

Processing type IDs showing the respective processing types are stored in the processing type field 42a. Target performance values (target numbers) configured for the respective processing types, are stored in the target performance value field 42b. The number of times per second that the storage apparatus 3 actually carries out data I/O processing corresponding to the respective processing types is stored in the measured performance value field 42c. The number of times the storage apparatus 3 actually accesses (inputs/outputs to/from) a disk drive per second in data I/O processing is stored in the disk use frequency field 42d. The upper limit numbers of the I/O processing counts in prescribed times resulting from the processing of corresponding processing types are stored in the processing upper limit field 42e. The "∞" is stored here when there is no need to restrict the processing count. Processing ratios, which constitute the criteria for the execution frequency of I/O processing of the corresponding processing types, are stored in the processing ratio field 42f.

In the performance management table 42 shown in FIG. 4, it is clear that the processing type IDs are "Job1", "Job 2", "Job 3" and "Other", and, for example, that for the processing type described by "Job 1", 3000 (IOPS) is configured as the target performance value, the measured performance value is 3500 (IOPS), the disk use frequency is 700 (IOPS), the processing upper limit is ∞, and the processing ratio is 3. Further, it is also clear that for the "Other" processing type, 1000 (IOPS) is configured as the target performance value, the measured performance value is 1100 (IOPS), the disk use frequency is 300 (IOPS), the processing upper limit is 1500, and the processing ratio is 1. In this embodiment, processing types, for which none of the IDs "Job 1", "Job 2" or "Job 3" is assigned, are handled as processing types that belong to "Other".

FIG. 5 is a diagram showing an example of a load status table according to one embodiment of the present invention.

The load status table 43 is a table, which shows the load statuses of the respective component parts of the storage apparatus 3, and is used by the QoS controller 4 to monitor the load statuses of the respective component parts, and check out a component part that constitutes a bottleneck. The load status table 43 comprises a parts field 43a; and a utilization factor field 43b. Names showing the monitoring-targeted component parts are stored in the parts field 43a. Utilization factors showing the loads of the corresponding component parts are stored in the utilization factor field 43b. As used here, utilization factor, for example, is the percentage of time during which a component part is being used.

From the load status table 43 shown in FIG. 5, it is clear that the monitoring-targeted component parts are processor A of the I/O processor 10A, processor B of the I/O processor 10B, volume A11A and volume B11B, and, for example, that the utilization factor for processor A is 62%.

FIG. 6 is a diagram showing an example of a parts management table according to one embodiment of the present invention.

The parts management table 44 shows the component parts of the storage apparatus 3, which are used for each processing type. The parts management table 44 comprises a processing type field 44a; processor A field 44b; processor B field 44c; volume A field 44d; and volume B field 44e.

Processing type IDs showing the processing types are stored in the processing type field 44a. Information as to whether or not a corresponding processing type uses processor A in I/O processing is stored in the processor A field 44b. In this embodiment, "1" is stored when processor A is used, and "0" is stored when processor A is not used. Information as to whether or not a corresponding processing type uses processor B in I/O processing is stored in the processor B field 44c. In this embodiment, "1" is stored when processor B is used, and "0" is stored when processor B is not used. Information as to whether or not a corresponding processing type uses volume A in I/O processing is stored in the volume A field 44d. In this embodiment, "1" is stored when volume A is used, and "0" is stored when volume A is not used. Information as to whether or not a corresponding processing type uses volume B in I/O processing is stored in the volume B field 44e. In this embodiment, "1" is stored when volume B is used, and "0" is stored when volume B is not used.

From the parts management table 44 shown in FIG. 6, it is clear that the processing of "Job 1" uses processor A and volume A in the I/O processing. Further, it is clear that volume B is used in both "Job 2" and "Job 3".

Returning to the explanation of FIG. 1, the control program 45 is for controlling the I/O control process in accordance with the processing of a plurality of processing types in the storage apparatus 3, and for executing in processor 40 the QoS control process for outputting the status of I/O processing. Furthermore, QoS control processing will be explained below.

(2) Data I/O Control Process (I/O Control Processing)

Next, an I/O control process, which is executed by the respective I/O processors 10 (10A, 10B) of the storage apparatus 3 according to one embodiment of the present invention, will be explained.

Figure 7:
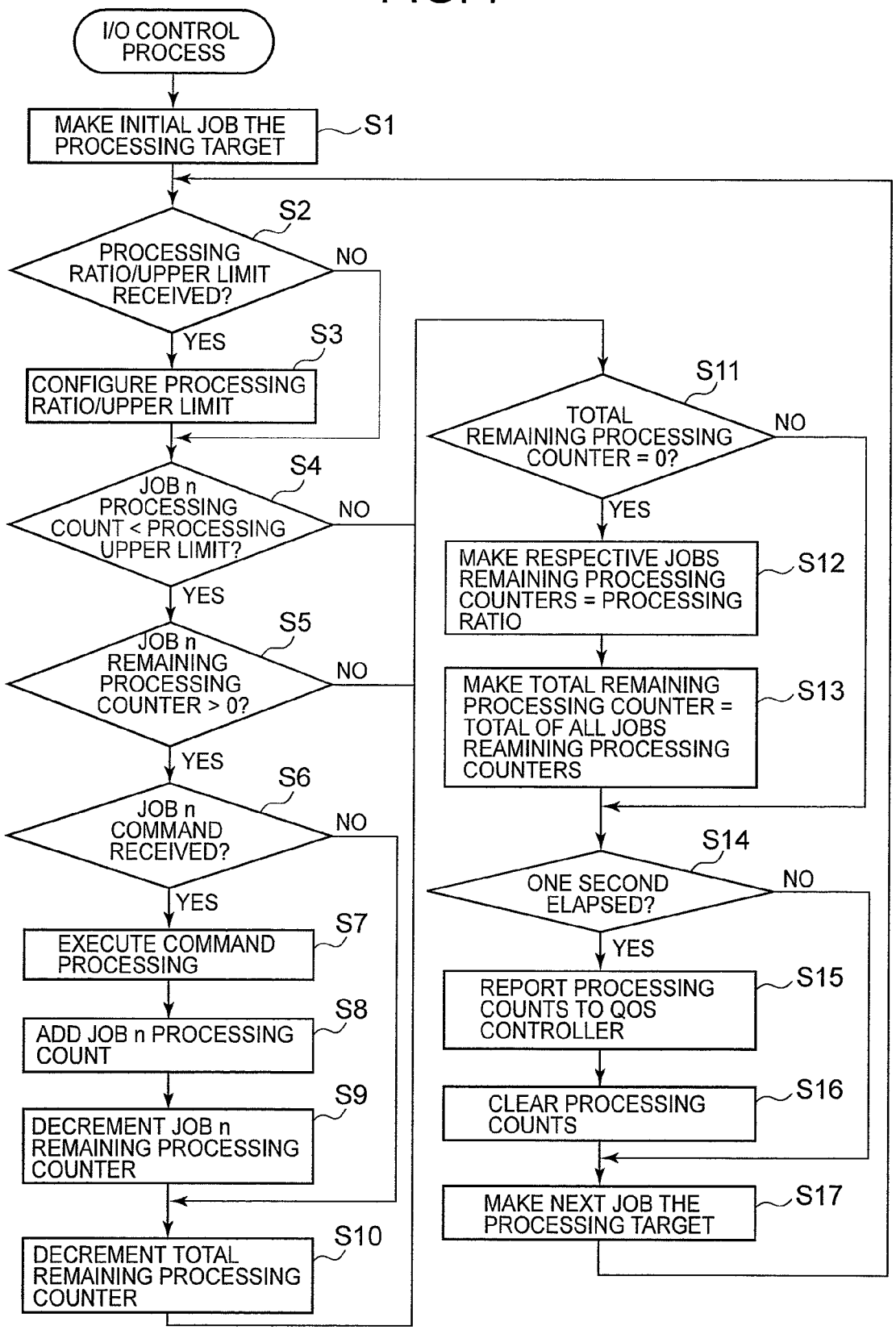
FIG. 7 is a flowchart of an I/O control process according to one embodiment of the present invention.

FIG. 7 is a flowchart of an I/O control process according to one embodiment of the present invention.

This I/O control process constitutes a loop structure, in which processing is carried out having one of the plurality of processing types as the processing targets, and when processing, which treated one processing type as the processing target, ends, the same processing is executed having another processing type as the processing target.

First, processor 20 decides to make a prescribed processing type, which has been stipulated as the initial order (Job 1, for example, for processor 20A), the processing target (Step S1).

Next, processor 20 determines whether or not a processing ratio and processing upper limit (change indication) have been received from the QoS controller 4 (Step S2). When the result of this step is that a change indication has been received (Step S2: YES), the processor 20 proceeds to Step S3, and when the determination is that a change indication has not been received (Step S2: NO), the processor 20 advances to Step S4.

In Step S3, the processor 20 stores the received processing ratio and processing upper limit in the processing ratio/upper limit table 22.

Next, the processor 20 determines whether or not the I/O processing count for the processing-targeted processing type (Job n) is less than the processing upper limit (Step S4), and when the processing count is less than the processing upper limit, since this means that I/O processing can still be executed, the processor 20 proceeds to the next Step S5, and when the processing count is not less than the processing upper limit, since it is necessary to restrict I/O processing in accordance with the relevant Job n processing, the processor 20 jumps to Step S11.

In Step S5, the processor 20 determines whether or not the remaining processing counter for Job n of the processing ratio/upper limit table 22 is greater than 0, and when the remaining processing counter is greater than 0, since this means that the I/O processing of the relevant Job n can be executed, the processor 20 proceeds to Step S6, but when the remaining processing counter is 0, since it is necessary to restrict Job n I/O processing, the processor 20 jumps to Step S11.

In Step S6, the processor 20 determines whether or not an I/O request (command) for Job n has been received from the host computer 2 (Step S6), and when this I/O request has not been received, since there is no need to carry out I/O processing, jumps to Step S10. Conversely, when an I/O request has been received, the processor 20 executes I/O processing in accordance with the I/O request (command) Step S7), and when processing has ended, increments by one (+1) the processing count for Job n, which is stored in the memory 21 (Step S8), and also decrements the Job n remaining processing counter by one (−1) (Step S9).

In Step S10, the processor 20 decrements the total remaining processing counter by one (−1). Furthermore, the total remaining processing counter is stored in the memory 21, and is used to store a value, which adds the remaining processing counters of all the processing types executed by the I/O processor 10. The total of the processing ratios of all the processing types executed by the I/O processor 10 is stored in the total remaining processing counter as the initialization value.

In Step S11, the processor 20 determines whether or not the total remaining processing counter has transitioned to 0. When the result of this step is that the total remaining processing counter is not 0 (Step S11: NO), this signifies that the respective processing types are not being afforded the opportunity to execute I/O processing at a frequency, which conforms to the processing ratio configured in the processing ratio/upper limit table 22, and therefore processing proceeds to Step S14.

By contrast, when the total remaining processing counter is 0 (Step S11:YES), this signifies that the respective processing types are being afforded the opportunity to execute I/O processing at a frequency, which conforms to the processing ratio configured in the processing ratio/upper limit table 22, and therefore the processor 20 copies as-is the processing ratio values of the respective processing types to the remaining processing counters of the respective processing types in the processing ratio/upper limit table 22 (Step S12), and stores the total value of the remaining processing counters of the respective processing types in the total remaining processing counter (Step S13).

In Step S14, the processor 20 determines whether or not one second has elapsed since either the start of processing or the reporting of the processing count to the QoS controller 4. When the result of this step is that one second has not elapsed (Step S14: NO), processing jumps to Step S17.

Conversely, when one second has elapsed, the processor 20 reports (sends) the processing counts for the respective processing types to the QoS controller 4 (Step S15), and clears to zero the processing counts for the respective jobs stored in the memory 21 (Step S16).

In Step S17, since the processing for the processing-targeted job has ended in accordance with the processing of Steps S2 through S16, the processor 20 decides the next sequence of jobs to be subsequently targeted for processing (Step S17), and executes processing beginning from Step S2.

(3) QoS Control Process

The QoS control process, which is executed by the processor 40 in the QoS controller 4 according to one embodiment of the present invention, will be explained next.

Figure 8:
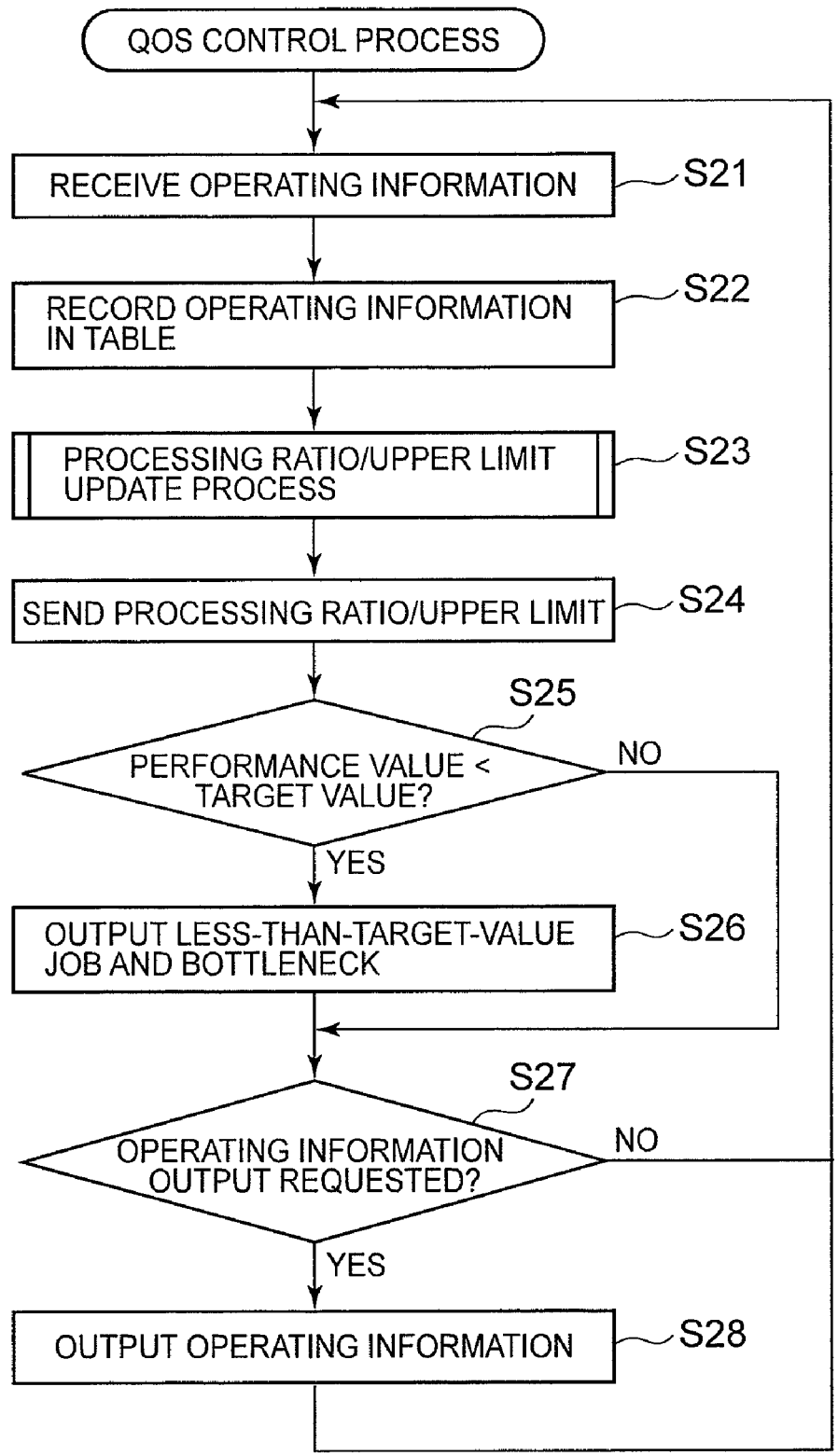
FIG. 8 is a flowchart of a QoS control process according to one embodiment of the present invention.

FIG. 8 is a flowchart of the QoS control process according to one embodiment of the present invention.

The processor 40 of the QoS controller 4 receives operating information, such as the processing count for each processing type, and the utilization factors for the respective component parts (processors, volumes, and so forth) related to the I/O processing of the storage apparatus 3, from the I/O processors 10 (10A, 10B) (Step S21).

Next, the processor 40 records the received operating information in the performance management table 42 and load status table 43 (Step S22). The processor 40 subsequently carries out update processing (See FIG. 9) of the processing ratio and processing upper limit (Step S23). Next, the processor 40 sends the values of the processing ratios and processing upper limits of the respective job types of the performance management table 42 to the I/O processors 10 (10A, 10B) utilized in the respective processing (Step S24).

Next, the processor 40 determines whether or not the measured performance values of the respective jobs are less than the target performance values (Step S25). When it is determined as a result that none of the job measured performance values is less than the target performance values, that is, all the measured performance values are greater than the target performance values, since this signifies that the respective jobs are being carried out properly, processing moves to Step S27. Conversely, when there is a job for which the measured performance value is less than the target performance value, the processor 40 outputs information showing the processing type, which fell below the target performance value, and information showing the component part determined to be the bottleneck, that is, the component part of which load is greater than a prescribed utilization factor (Step S26). Here, a component part, which is related to the I/O processing of a processing type, and a component part, of which load is greater than a prescribed utilization factor, can be determined beforehand in the processing of Step S23, and in Step S26, outputting can be carried out using this determined information.

Further, methods for outputting information showing the processing types, and information on the component part, which could be determined to be the bottleneck, for example, can include outputting this information to the management terminal 5 in a mode, which enables this information to be displayed and outputted as a message on the management terminal 5, sending (outputting) an e-mail message comprising this information to the administrator's address, or outputting this information to the prescribed syslog (system log).

Next, the processor 40 determines whether or not an output request for the operating information has been received from the management terminal 5 (Step S27). When the result of this step is that the output request has not been received, processing is executed once again from Step S21, and when the output request has been received, operating information is acquired from the performance management table 42 and the load status table 43, and outputted (Step S28). Output methods include outputting the operating information to the management terminal 5 in a mode, which enables this operating information to be outputted and displayed as a message on the management terminal 5, sending (outputting) an e-mail message comprising the operating information to the administrator's address, or outputting this information to the prescribed syslog (system log).

Here, the load of the storage apparatus 3 will fluctuate greatly in accordance with the data I/O pattern and device status. For example, the load is relatively low in the case of an I/O pattern in which data is repeatedly written and read to and from the cache memory, but the load is relatively high for an I/O pattern, which must access the disk due to a cache miss. Further, even when the IOPS value is the same, the load becomes relatively high when the data size (transfer length) read and written one time is long. Furthermore, when a failure occurs in a part of the storage apparatus 3, such as the disk drive or cache memory, the load on the remaining component parts and the processor 20 becomes high.

In the storage apparatus 3, it is important to devise a performance design with the flexibility to satisfy the target performance in all cases, but building too much flexibility into the performance design increases the cost. Accordingly, in a storage system 1, which takes cost factors into account, there is the danger of creating a situation in which the target performance value cannot be satisfied by adjusting the processing upper limit due to a lack of processing capabilities in the storage apparatus 3.

By contrast, in this embodiment, since the performance values for the respective jobs, and operating information, such as the utilization factors of the respective component parts in the storage system 1, are outputted when there is a request from the administrator, or when the target performance value is not satisfied as described hereinabove, the administrator can readily cope with the situation by monitoring whether or not the data I/O performances of the respective jobs are satisfying the target performances, and the utilization factors of the respective component parts.

(4) Processing Ratio/Upper Limit Update Process

Next, the update process for the processing ratio/upper limit executed by the processor 40 of the QoS controller 4 according to one embodiment of the present invention will be explained.

Figure 9:
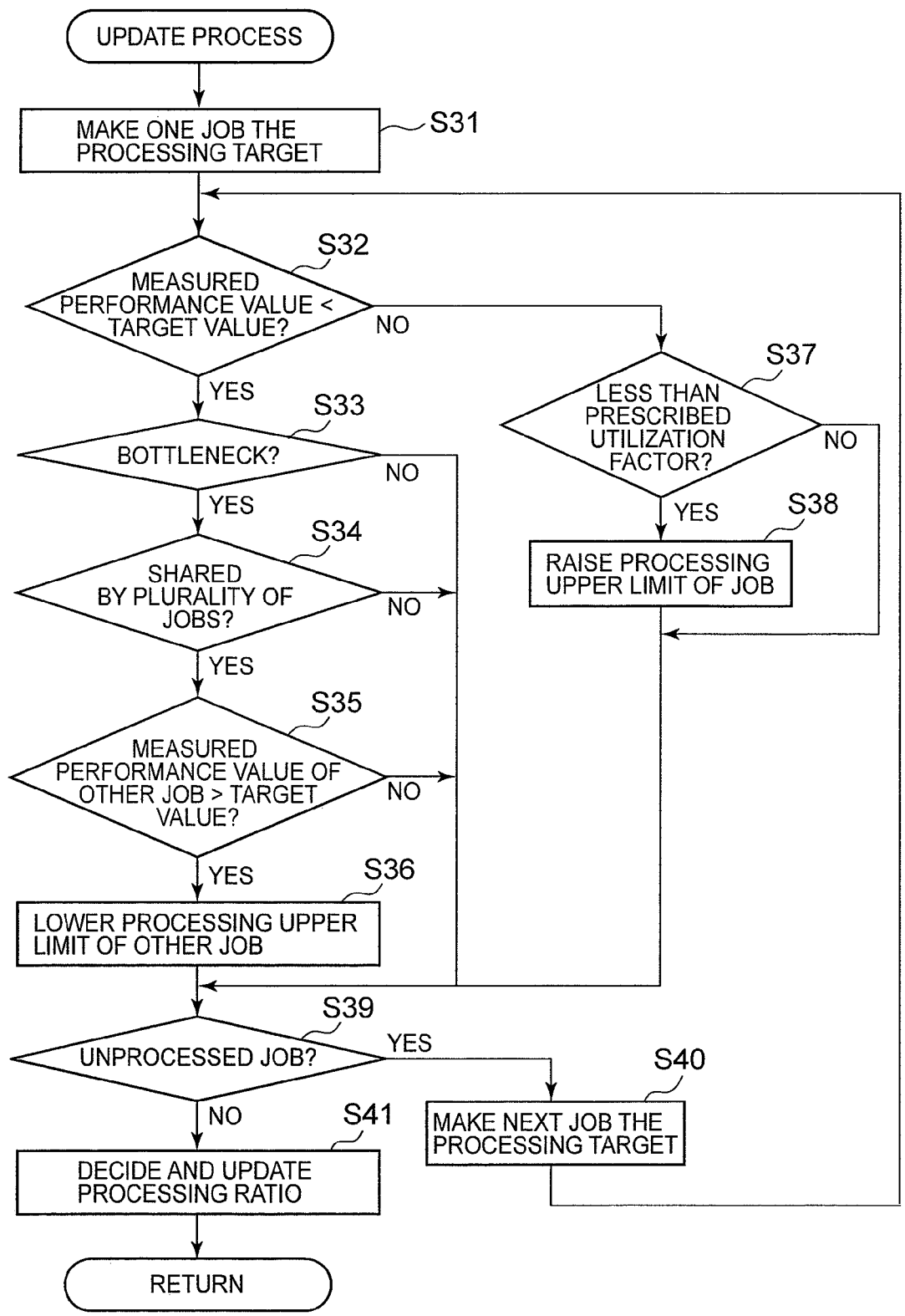
FIG. 9 is a flowchart of a processing ratio/upper limit update process according to one embodiment of the present invention.

FIG. 9 is a flowchart of the update process for the processing ratio/upper limit according to one embodiment of the present invention.

First, the processor 40 decides one processing type (for example, Job 1) as the processing target (Step S31).

Next, the processor 40 determines whether or not the measured performance value is less than a target value for the relevant processing-targeted job (first processing type) (Step S32). When it is determined as a result that the measured performance value is less than the target value (Step S32: YES), the processor 40 determines whether or not there is a component part, which constitutes a bottleneck, among the component parts being used for the relevant job (Step S33). More specifically, the processor 40, based on the load status table 43 and parts management table 44, determines whether or not there is a component part with a utilization factor, which is greater than that deemed sufficient for a bottleneck (for example 80%), among the component parts being used in the relevant job.

When, as a result of this step, it is determined that there is a component part, which constitutes a bottleneck (Step S33: YES), the processor 40 proceeds to Step S34, and when it is determined that there is no component part constituting a bottleneck (Step S33: NO), the processor 40 jumps to Step S39.

In Step S34, the processor 40 references the parts management table 44 to determine whether or not the component part constituting the bottleneck is being shared by a plurality of jobs (Step S34), the when it is determined that the bottleneck component part is being shared (Step S34: YES), the processor 40 moves to Step S35, and when it is determined that the bottleneck component part is not being shared (Step S34: NO), the processor 40 jumps to Step S39.

In Step S35, the processor 40 references the parts management table 44 to determine whether or not the measured performance value exceeds the target value for the other job (second processing type), which is sharing the bottleneck component part (Step S35), and when it is determined that the measured performance value exceeds the target value (Step S35: YES), the processor 40 lowers the value of the processing upper limit of the relevant other job in the performance management table 42 (Step S36). In this embodiment, the processor 40 makes the processing upper limit a value, which is less than the measured performance value, but greater than the target performance value. Consequently, in the storage apparatus 3, the processing-targeted job can utilize the bottleneck component part higher frequency, as the relevant other job utilizes it lower frequency within a range that the relevant other job can achieve the target performance. Therefore, it is possible to enhance the measured performance value of the processing-targeted job.

Furthermore, in Step S35, when it is determined that the measured performance value does not exceed the target value for the other job, which is sharing the bottleneck component part (Step S35: NO), the processor 40 jumps to Step S39.

By contrast, in Step S32, when the determination is that the measured performance value is not less than the target value for the processing-targeted job (Step S32: NO), the processor 40 references the load status table 43 to determine whether or not the component part to be used by the relevant job is less than a relatively low prescribed utilization factor (for example, 40%) (Step S37), and when the determination is that the utilization factor of the component part is less than the prescribed utilization factor (Step S37: YES), since this signifies that the processing upper limit can be raised without a hitch, the processor 40 raises the value of the processing upper limit of the relevant job in the performance management table 42 (Step S38). Consequently, when the utilization factors of the respective component parts are less than a prescribed utilization factor, it is possible to raise the processing upper limit of the relevant job, and more efficiently execute the relevant job. Conversely, when the utilization factors of the respective component parts are not less than the prescribed utilization factor (Step S37: NO), the processor proceeds to Step S39.

In Step S39, the processor 40 determines whether or not there is an unprocessed job, which has not been targeted for processing (Step S39), and when it is determined that there is an unprocessed job (Step S39: YES), the processor 40 makes the unprocessed job a processing target (Step S40), and executes processing beginning at Step S32.

Conversely, when all of the jobs have been made processing targets, the processor 40 references the parts management table 44 and performance management table 42 to decide the processing ratios of the respective jobs, and to update the processing ratios in the performance management table 42 (Step S41). In this embodiment, the processor 40 references the parts management table 44, specifies the jobs to be executed by the same processor, references the performance management table 42, acquires the target performance values of these jobs, computes the integer ratios of the target performance values of these jobs, and decides the values of the integer ratios as the respective job processing ratios.

(5) Concrete Example of I/O Process Control

An example of I/O process control in a storage system according to one embodiment of the present invention will be explained.

FIG. 10 is a diagram illustrating an example of I/O process control according to one embodiment of the present invention. It is supposed here that in this example, the host computers 2 (2A, 2B) are connected to the storage apparatus 3 as shown in FIGS. 1 and 10, the values shown in FIG. 2 are configured in the processing ratio/upper limit table 22A of the I/O processor 10A, the values shown in FIG. 3 are configured in the processing ratio/upper limit table 22B of the I/O processor 10B, the values shown in FIG. 4 are configured in the processing performance management table 42 of the QoS controller 4, the values shown in FIG. 5 are configured in the load status table 43, and the values shown in FIG. 6 are configured in the parts management table 44.

In host computer A (2A), an application program corresponding to Job 1 and Job 2 is executed, and the data I/O processing of these jobs is carried out by the I/O processor A (10A). Further, in host computer B (2B), an application program corresponding to Job 3 is executed, the data I/O processing thereof is carried out by I/O processor B (10B).

Also, the data of Job 1 and the Other Job are stored in volume A (11A), and the data of Job 2 and Job 3 are stored in volume B (11B). Further, the target performance values of Job 1, Job 2, Job 3 and the Other Job are 3000, 2000, 2000 and 1000, as shown in FIG. 4.

In a situation like this, a decision is made in the QoS controller 4 such that a processing ratio/upper limit update process matches the processing ratio for the respective jobs executed by the same processor to the ratio of the target performance values (Step S41). That is, in this example, since the target performance value ratio of Job 1 and Job 2, which are processed by I/O processor A (10A), is 3000:2000=3:2, the processing ratios for Job 1 and Job 2 are decided as 3 and 2, respectively. Conversely, since the target performance value ratio of Job 3 and the Other Job, which are processed by I/O processor B (10B), is 2000:1000=2:1, the processing ratios of Job 3 and the Other Job are decided as 2 and 1, respectively.

Further, in the QoS controller 4, when a plurality of jobs share a volume, and the shared volume constitutes a performance bottleneck, a processing upper limit is configured by a processing ratio/upper limit update process such that the respective jobs satisfy the target performance value.

In this example, referencing the performance management table 42 makes it clear that the measured performance value of Job 2 (1000) has not reached the target performance value (2000). In order to raise the measured performance value of this Job 2, processing for adjusting the processing upper limit is carried out in a processing ratio/upper limit update process in the QoS controller 4.

First, the processor 40 of the QoS controller 4 specifies the component part of the storage apparatus 3, which constitutes the bottleneck of Job 2 (Step S33). The utilization factors of the respective component parts are used as the determination criteria here, and, for example, a determination is made that a component part with a utilization factor of 80% or more constitutes a performance bottleneck. In this example, since volume B (11B) has a utilization factor of 95%, volume B (11B) is determined to be the bottleneck.

Next, the processor 40 of the QoS controller 4 searches among the jobs sharing the bottleneck component part for a job that exceeds the target performance value, and lowers the processing upper limit of the relevant job (Steps S34 through S36). In this example, since Job 2 and Job 3 share volume B (11B), and the measured performance value of Job 3 exceeds the target performance value, the processor 40 lowers the processing upper limit of Job 3. In this example, for instance, the value of the Job 3 processing upper limit is configured to a new processing upper limit value, which is not less than the target performance value (2000), and less than the measured performance value (4000), (for example, 3000).

When the processing upper limits of the respective jobs are decided in the QoS controller 4 like this, these processing upper limits are sent to the storage apparatus 3, and the storage apparatus 3 operates such that the I/O processing count per prescribed time for the respective jobs falls within the processing upper limit sent from the QoS controller 4.

Consequently, since the number of Job 3 I/O processes relative to volume B (11B) carried out within a prescribed time in the storage apparatus 3 falls within the new processing upper limit, and the Job 3 load on volume B is reduced, it becomes possible to increase the I/O processing count for Job 2, thus enabling the realization of the target performance value for Job 2.

The preceding explanation of the present invention was based on the embodiment, but the present invention is not limited to the above-described embodiment, and is applicable to a variety of other modes.

For example, in the above-described embodiment, the QoS controller 4 and storage apparatus 3 are separate units, but the present invention is not limited to this, and can be constituted such that the QoS controller 4 is provided inside the storage apparatus 3, or the QoS controller 4 is provided inside the host computer 2. In this case, the processor, memory and other units can be shared.

Further, in the above-described embodiment, the processors 20 of the I/O processors 10, and volumes 11 were given as examples of storage apparatus 3 component parts related to I/O processing, but the present invention is not limited to this, and, for example, the utilization factors of the respective data paths leading to the volumes 11 from the I/O processors 10, and of the respective processors, which directly control I/O to the volumes 11 can be detected, and based on these utilization factors, the processing upper limits of I/O processing relative to I/O requests for processing of respective processing types can be adjusted.

What is claimed is:

1. A storage apparatus, which executes input/output (I/O) processing relative to a volume based on an input/output request in accordance with processing of a plurality of processing types being executed by a host computer, comprising:
an upper limit number storage unit which stores an upper limit number per prescribed time for an input/output processing count resulting from the processing of the processing type for each of the plurality of processing types;
a receiving unit which receives the input/output request from the host computer; and
an input/output processing execution unit which executes input/output processing corresponding to the received input/output request such that the input/output processing count resulting from the processing of each of the processing types per the prescribed time falls within the upper limit number;
a target number storage unit which stores a target number, which is the a targeted input/output processing count for each of the processing types;
a first target determination unit which determines whether or not the input/output processing count per prescribed time reaches at least the target number for each of the processing types;
a shared processing type specification unit which specifies a second processing type, which shares a same storage apparatus component part as the input/output processing of a first processing type, when a determination has been made that the input/output processing count for the first processing type does not reach the target number;
a second target determination unit which determines whether or not the input/output processing count for the second processing type exceeds the target number; and
an upper limit adjustment unit which lowers the upper limit number of the second processing type, which is stored in the upper limit number storage unit, when determination has been made that the input/output processing count for the second processing type exceeds the target number.

2. The storage apparatus according to claim 1, wherein the input/output processing execution unit comprises:
a counter unit which counts the input/output processing count corresponding to the input/output request for each of the processing types per the prescribed time;
a processing count determination unit which determines whether or not the processing count exceeds the upper limit number for each of the processing types; and a process restrict unit which restricts execution of the input/output processing corresponding to the input/output request in accordance with the processing of the processing type, for the processing type determined to exceed the upper limit number.

3. The storage apparatus according to claim 1, wherein
the input/output request comprises processing type information showing the processing type of the input/output request processing which has been carried out; and
the input/output processing execution unit determines the processing type of the input/output request processing which has been carried out, based on the processing type information.

4. The storage apparatus according to claim 1, further comprising a frequency criteria information storage unit which stores frequency criteria information, which sets frequency criteria for executing the input/output processing for each of the processing types,
wherein the input/output processing execution unit executes the input/output processing for each of the processing types based on the frequency criteria information.

5. The storage apparatus according to claim 4, wherein the input/output processing execution unit determines whether or not the input/output requests in accordance with the processing of each of the processing types are received at a frequency corresponding to the frequency criteria information for each of the processing types when the processing count for the input/output processing corresponding to the processing of all the processing types falls within the upper limit number, and executes input/output processing corresponding to the received input/output request.

6. The storage apparatus according to claim 4, wherein the frequency criteria information is decided based on a target number, which is the targeted input/output processing count for each of the processing types.

7. The storage apparatus according to claim 1, further comprising:
a load detection unit which detects loads of a plurality of component parts related to the input/output processing of the storage apparatus; and
a load determination unit which determines whether or not a component part, which is used in the input/output processing of the processing of the first processing type determined by the first target determination unit that the target number is not reached, is at least a predetermined load,
wherein the shared processing type specification unit specifies the second processing type, which shares the component part determined to be at least the predetermined load.

8. The storage apparatus according to claim 1, further comprising a processing information output unit which outputs information showing the first processing type which has been determined by the first target determination unit that the target number is not reached.

9. The storage apparatus according to claim 8, further comprising:
a load detection unit which detects loads of a plurality of component parts related to the input/output processing of the storage apparatus; and
a load determination unit which determines whether or not a component part, which is used in the input/output processing of the processing of the first processing type determined by the first target determination unit that the target number is not reached, is at least a predetermined load,
wherein the processing information output unit further outputs information showing the component part, which has been determined to be at least the predetermined load.

10. The storage apparatus according to claim 9, wherein the component parts comprise a plurality of volumes for which data is inputted and outputted by input/output processing corresponding to input/output requests in accordance with a plurality of the processing types.

11. A process controller, which controls input/output processing in a storage apparatus corresponding to an input/output request in accordance with the processing of a plurality of processing types,
wherein the storage apparatus has an upper limit number storage unit which stores an upper limit number per prescribed time for input/output processing in accordance with the processing of the processing type for each of a plurality of processing types,
the process controller comprising:
a target number storage unit which stores a target number, which is a targeted input/output processing count for each of the processing types;
a processing count receiver which receives from the storage apparatus an input/output processing count for each of the processing types per prescribed time;
a first target determination unit which determines whether or not the input/output processing count per the prescribed time for each of the processing types reaches the target number;
a shared processing type specification unit which specifies a second processing type, which shares a same storage apparatus component part as the input/output processing in a first processing type, when a determination has been made that the input/output processing count of the first processing type of the first processing type does not reach the target number;
a second target determination unit which determines whether or not the input/output processing count for the second processing type exceeds the target number; and
an upper limit controller which controls the lowering of the upper limit number of the second processing type in the upper limit number storage unit of the storage apparatus, when determination has been made that the input/output processing count for the second processing type exceeds the target number.

12. The process controller according to claim 11, further comprising a processing information output unit which outputs information showing the first processing type determined by the first target determination unit that the target number is not reached.

13. The process controller according to claim 12, further comprising:
a load detection unit which detects loads of a plurality of component parts related to the input/output processing of the storage apparatus; and
a load determination unit which determines whether or not a component part, which is used in the input/output processing of the processing of the first processing type, determined by the first target determination unit that the target number is not reached, is at least a predetermined load,
wherein the processing information output unit further outputs information showing the component part, which has been determined to be at least the predetermined load.

14. A storage system, which comprises a process controller, and a storage apparatus for executing input/output processing relative to a volume based on an input/output request in accordance with the processing of a plurality of processing types executed by a host computer, wherein the storage system comprises: an interface, which is connected to the host computer; a first memory; and a first processor, the first memory stores an upper limit table for storing an upper limit number per prescribed time for an input/output processing count resulting from the processing of the processing type for each of the plurality of processing types;

the first processor executes input/output processing corresponding to the input/output request such that the input/output processing in accordance with the processing of each of the processing types per the prescribed time falls within the upper limit number, counts the input/output processing count corresponding to the input/output request for each of the processing types per the prescribed time, sends the processing count to the process controller, detects the loads of a plurality of component parts of the storage apparatus related to the input/output processing, sends load information showing the loads to the process controller, and updates the upper limit number in the upper limit table based on an indication from the process controller, and wherein the process controller comprises:

a second memory; and a second processor, the second memory stores a target number table for storing a target number, which is the targeted input/output processing count for each of the processing types, and the second processor receives from the storage apparatus the processing count per the prescribed time for each of the processing types, determines whether or not the input/output processing count in the prescribed time for each of the processing types is not less than the target number, specifies a second processing type, which shares a same storage apparatus component part as the input/output processing for a first processing type when it is determined that the target number for the first processing type is not reached, determines whether or not the input/output processing count for the second processing type exceeds the target number, and when a determination is made that the input/output processing count for the second processing type exceeds the target number, sends an indication for lowering the upper limit number of the second processing type in the upper limit table of the storage apparatus to the storage apparatus.

* * * * *